E. G. GLASER.
AUTOMOBILE WHEEL.
APPLICATION FILED FEB. 6, 1913.

1,084,144.

Patented Jan. 13, 1914.

2 SHEETS—SHEET 1.

E. G. GLASER.
AUTOMOBILE WHEEL.
APPLICATION FILED FEB. 6, 1913.
1,084,144.
Patented Jan. 13, 1914.
2 SHEETS—SHEET 2.
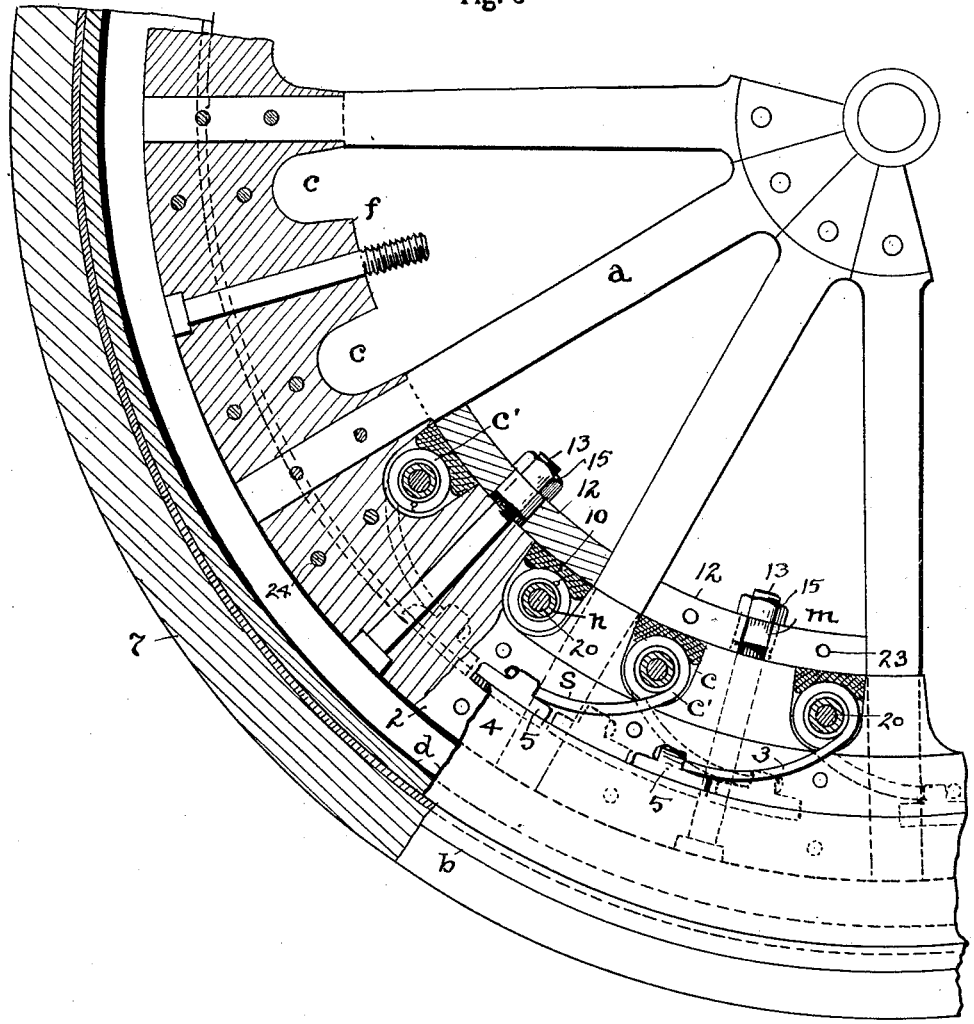

UNITED STATES PATENT OFFICE.

EMIL G. GLASER, OF NORTH DOVER, OHIO.

AUTOMOBILE-WHEEL.

1,084,144. Specification of Letters Patent. Patented Jan. 13, 1914.

Application filed February 6, 1913. Serial No. 746,472.

*To all whom it may concern:*

Be it known that I, EMIL G. GLASER, citizen of the United States, residing at North Dover, in the county of Cuyahoga and State of Ohio, have invented certain new and useful Improvements in Automobile-Wheels, of which the following is a specification.

This invention has reference to automobile wheels, and the invention consists in a wheel having a spring supported tire, all substantially as shown and described and particularly pointed out in the claims.

Figure 1:
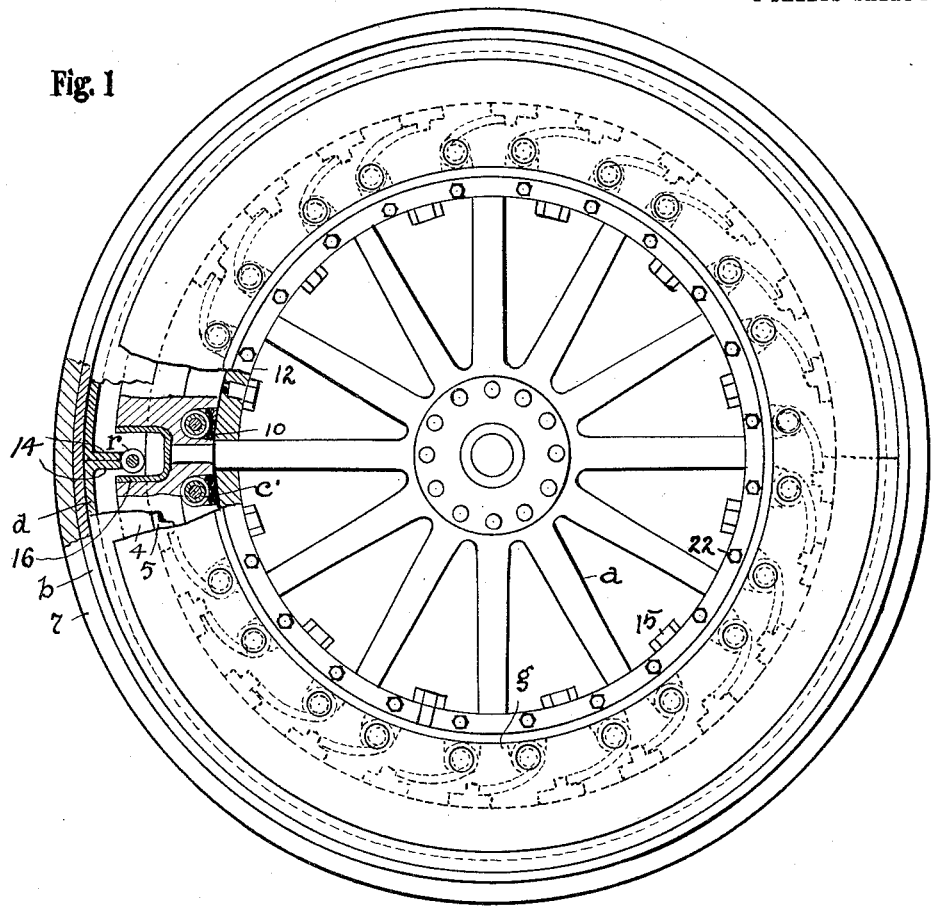
Figure 2:
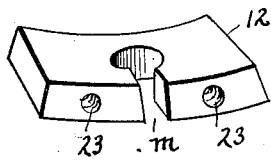
Figure 3:
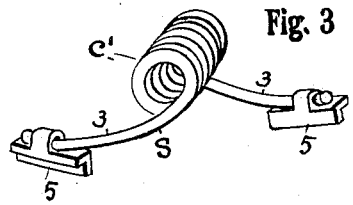

In the accompanying drawings, Figure 1 is a side elevation of my new and improved wheel with a portion in section. Fig. 2 is an enlarged perspective view of one of the several segments between spokes of the wheel. Fig. 3 is a perspective view of one of the several sustaining springs. Fig. 4 is a cross section of the wheel, and Fig. 5 is a sectional elevation on the line of the spokes.

The object of the construction as thus shown is to make a wheel with metallic springs adapted to substitute the well known pneumatic tire and with substantially the same or equivalent resilient effect but which is materially cheaper in initial cost and is more durable in service.

To these several ends I make a wheel with suitably heavy spokes $a$, and build up the tire support between the outer ends of said spokes and the tire by means of several parts comprising, first, a wooden felly $f$, fixed firmly upon the ends of the spokes. Flat face plates 2 are shown as bolted to the sides of the felly and two transverse cavities or recesses $c$ are formed in the inner side or portion of the felly between each set of spokes and adapted to receive the spiral coils $c'$ of the several wire springs $s$. The said springs, coils or bodies in their length are equal to the width of the felly in said cavities, and the ends 3 of said springs come at the sides of the felly and are bent or extended outward in opposite directions and adapted to rest operatively in sustaining relations to the side or side flanges 4 of the tire supporting rim $d$. The said rim is approximately U-shape in cross section but its outer surface is practically flat and its sides are at right angles thereto and adapted to rest closely against the flat side face plates 2 of the felly as well as to overlap said faces approximately half their depth in the normal position of the parts. Of course the depression is greater than this under the load, and the ends or arms 3 of said spring have shoes 5 secured thereon and in immediate sustaining relations to said flanges or sides 4 of the rim. The said shoes are right angled in cross section and the said rim is rabbeted inside at its edge to engage said shoe as clearly seen in Fig. 4. All the springs are under more or less tension all the time, but the maximum tension comes as they get under the load successively.

The tire supporting band $b$ is secured directly upon the rim $d$ and may be of the clencher type shown or any other suitable kind, and a solid tire 7 is used.

The springs $s$ are confined in the cavities $c$ by suitable packing 10 of rubber or other material, and segments 12 which fit between the spokes must be entered from the side and hence have open slots $m$ through which the bolts 13 are engaged therewith and thus the felly and the springs and said segments are built together. The felly is a fixed and immovable portion of the wheel as usual and the nuts 15 for bolts 13 have bosses to fit within the enlarged eye of slots $m$ and to lock the segments against lateral displacement.

The tire supporting rim $d$ is a cast metal member and shown herein as made in two semi-circular pieces provided with end portions 14 extending inward together at right angles and carrying a small roller $r$ adapted to engage the wall of a cavity or pocket 16 in the felly and thus bring the said rim into positive driving relations with the felly and yet leaving room for the play of the rim under its spring in respect to the felly. This makes the said rim practically endless, in effect.

It will be noticed that the arms $a$ of the springs extend in opposite directions from opposite ends of the coil, and this brings the shoes 5 fixed thereon into staggered or alternate relations from side to side at the sides of the rim. This is shown in Fig. 5, where the arm of one spring crosses the arm of the other spring and the shoes are in corresponding crossed positions, and thus a practically continuous spring support is provided for the rim and the weight of the load in no case comes exclusively upon a single spring but in fact is divided practically upon three or four or more on each side.

The spring coil $c'$ is about a sleeve $n$ on the transverse bolt 20 which carries the spring and connects the plates *g*, which closely overlap the sides of the rim, the shoes 5, and the spring arms. The said plates are contracted at their inner edges and secured by screws 22 to the sides of the segments 12 in holes 23. This makes a practically dust and moisture proof housing for the working parts as well as affording due protection about the sides against possible displacement of parts. Bolts 24 tie the side plates 2 to the felly.

What I claim is:

1. A vehicle wheel having a felly, a rim about and apart therefrom having sides overlapping the sides of the felly, springs seated in the felly having arms at their ends on opposite sides of the wheel and shoes on said arms engaging the edges of the said rim.

2. A vehicle wheel having a felly provided with cavities transversely on its inside, coiled springs confined in said cavities having arms at their ends projecting in opposite directions at the sides of the felly and a tire supporting rim about the felly having flat sides operatively engaged by the arms of said springs.

3. A wheel having a felly with transverse cavities open on its inner side, springs with coils in said cavities and means confining said springs comprising segments behind said coils and bolts through said felly locking said segments in place, and a tire supporting member about said felly supported by said springs.

4. In automobile wheels, a wheel having a felly, coiled spring supports located transversely in the inner portion thereof and having opposite sustaining arms at the sides of the felly, in combination with a rim about the felly having sides overlapping the same and operatively engaged at their edges by said arms, and side plates on said felly overlapping the sides of said rim.

5. A wheel having a felly provided with cavities at intervals in its inner portion, spiral springs supported in said cavities provided with arms at their ends at the sides of the felly, segments confining said springs in said cavities, a tire supporting rim of approximately U shape overlapping the sides of said felly and engaged at its edges by the ends of said springs, the arms of the said springs extending in opposite directions from the ends thereof and overlapping as compared from side to side.

In testimony whereof I affix my signature in presence of two witnesses.

EMIL G. GLASER.

Witnesses:
F. C. Mussun,
E. M. Fisher.

---

Copies of this patent may be obtained for five cents each, by addressing the "Commissioner of Patents, Washington, D. C."